April 12, 1955

R. B. LEWIS 2,705,867

ENGINE HAVING A ROTOR WITH A PLURALITY
OF CIRCUMFERENTIALLY-SPACED
COMBUSTION CHAMBERS

Filed June 30, 1949

INVENTOR.
ROBERT B. LEWIS.

BY *Victor D. Behn*

ATTORNEY

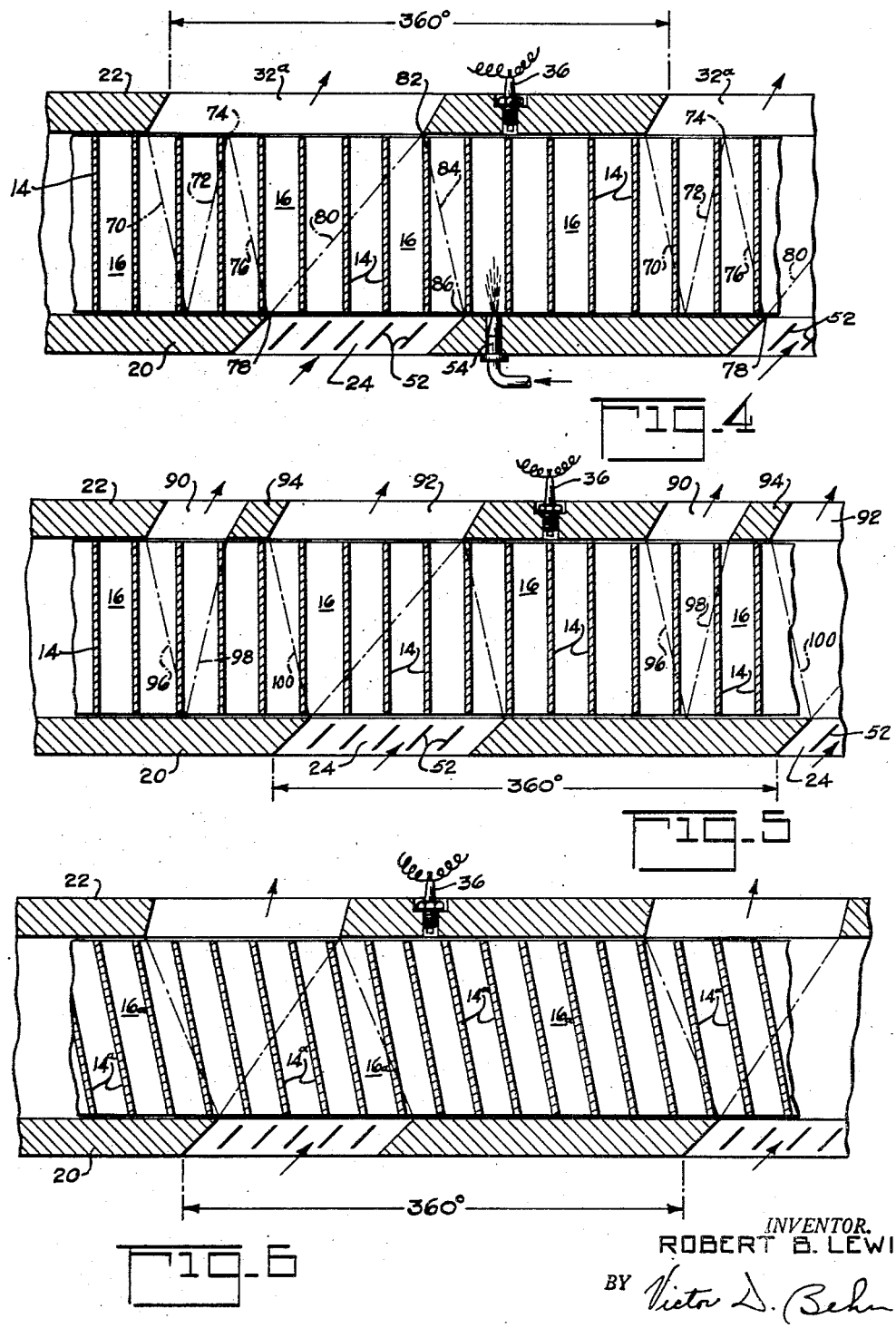

INVENTOR.
ROBERT B. LEWIS.
BY
ATTORNEY

United States Patent Office 2,705,867
Patented Apr. 12, 1955

2,705,867

ENGINE HAVING A ROTOR WITH A PLURALITY OF CIRCUMFERENTIALLY-SPACED COMBUSTION CHAMBERS

Robert B. Lewis, Glen Rock, N. J., assignor to Curtiss-Wright Corporation, a corporation of Delaware Application June 30, 1949, Serial No. 102,197

3 Claims. (Cl. 60—39.34)

This invention relates to power plants and is particularly directed to a power plant having a rotary combustion unit.

An object of the invention comprises the provision of a power plant having a rotary combuston unit in which air or other charge is admitted sequentially into a plurality of rotor chambers for combustion, at constant volume, with fuel therein; the combustion gases discharging sequentially from said chambers into an exhaust port. A further object of the invention is directed to a novel porting arrangement for such a rotary combustion unit in order to obtain compression of the air or other charge supplied thereto. The rotary feature of the combustion unit of the present invention provides for substantially steady flow through the inlet and exhaust ducts of the combustion unit thereby minimizing flow losses in said ducts. In addition, because of said rotary feature the inlet and exhaust ports of the combustion unit can have an effective area transverse to flow therethrough at least equal to the effective cross-sectional area of the combustion chamber thereby providing for maximum use of the available combustion chamber volume, maximum scavenging of the exhaust products after each combustion, and minimum flow losses in said ports.

Specifically the invention comprises a power plant rotor having a plurality of combustion chambers disposed about its periphery. Upon rotation of said rotor, said chambers sequentially communicate with an inlet port and sequentially communicate with an exhaust port. The cycle of operation of each rotor combustion chamber is as follows: A charge is drawn into said chamber while said chamber communicates with said inlet port. Combustion then takes place in said chamber while it is closed to both ports and thereafter the combustion gases discharge from said chamber into the exhaust port. The porting arrangement is such that the pressure of the charge trapped in said chambers is greater than the pressure in said inlet port. The combustion gases discharging from each said chamber into the exhaust port preferably help to draw a fresh charge into said chamber. The gases discharging from said chambers may be used for providing the power plant with jet propulsive thrust and/or they may be used for driving a turbine. In addition, said gases, as they discharge from the rotor combustion chambers, may drive said rotor and/or a turbine driven by said gases may drive said rotor.

Other objects of the invention will become apparent upon reading the annexed detailed description in connection with the drawing, in which:

Figures 4, 5 and 6 are developments similar to Figure 3 but of modified combustion chamber rotor units.

Figure 1:
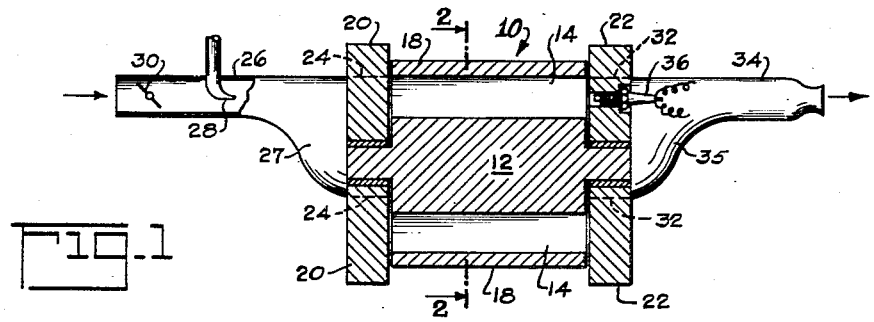
Figure 1 is an axial sectional view of a rotary combustion unit and power plant embodying the invention.
Figure 2:
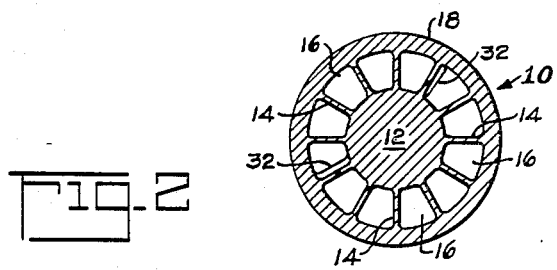
Figure 2 is a sectional view taken along line 2—2 of Figure 1.
Figure 3:
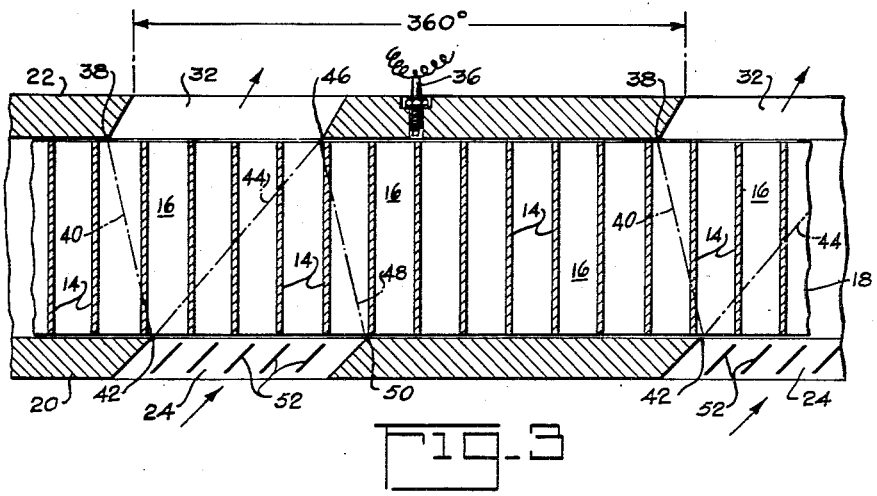
Figure 3 is a development of the combustion chamber rotor unit of Figures 1 and 2.

Referring first to Figures 1 to 3 of the drawing, a rotary combustion unit 10 embodying the invention comprises a rotor 12 having a plurality of circumferentially spaced vanes 14 extending radially therefrom to form chambers 16 about the periphery of said rotor. The chambers 16 extend from one end of the rotor 12 to the other end and their outer peripheries are closed by a cylindrical wall 18 which, as illustrated, is integral with the vanes 14. As will be apparent, however, the wall 18 may form part of a stator structure disposed across the radially outer ends of the vanes 14 in minimum clearance relation to said vanes. The rotor 12 is journaled in a stator structure comprising end walls 20 and 22, each of said end walls closing off the adjacent ends of the chambers 16 except when said chambers communicate with ports in said walls. The end wall 20 has an inlet port 24 through which air, from a duct 26, is supplied sequentially into the rotor chambers 16 as said chmabers move across said port. Fuel is added to the air supplied to the chambers 16 by means of a fuel nozzle 28 disposed in the duct 26. The quantity of fuel is proportioned to the air flow by any conventional fuel-air proportioning means so as to form a combustible mixture within the chambers 16. A throttle valve 30 may be provided for controlling the air supply.

The end wall 22 has an outlet or exhaust port 32 communicating with an exhaust duct 34 and with which the chambers 16 sequentially communicate. An igniter, such as a spark plug 36, is supported by one of the end walls 20 and 22 for sequentially igniting the combustion mixture in the chambers 16. The combustion mixture in each chamber 16 is ignited while said chamber is closed to both the intake port 24 and to the exhaust port 32 thereby providing substantially constant volume combustion. As hereinafter explained the rotor 12 may be driven directly by the combustion gases as said gases discharge from the rotor chambers 16 and/or said gases may drive a turbine which in turn drives said rotor.

The ports 24 and 32 have a substantial circumferential width. Accordingly the intake duct 26 preferably flares out, as indicated at 27, in order to provide smooth flow into said port throughout its entire circumferential width. Similarly the exhaust duct 34 preferably flares out to the circumferential width of its port as indicated at 35. As illustrated, the cross-sectional area of each chamber 16, normal to the direction of flow therethrough, is constant from one end of the chamber to the other.

The cycle of operation of the rotary combustion unit 10 and the relative arrangement of the inlet port 24, the exhaust port 32 and the igniter 36 may best be understood by reference to Figure 3 which shows the cycle of operation as the chambers 16 move around the axis of their rotor 12. In Figure 3 the direction of rotation of the rotor 12 is assumed to be such that the chambers 16 move from left to right. As the rotor 12 rotates, the inlet ends of the chambers 16 are placed sequentially into communication with the intake port 24 for admission of the fuel-air charge therein. As hereinafter described each said charge is compressed within its chamber 16 to a pressure above the pressure in the intake port 24. The chambers 16, with their combustion mixtures, sequentially move past the igniter 36 which is so disposed and arranged that combustion is initiated in each chamber 16 after said chamber has moved beyond the intake port 24 and before said chamber moves into communication with the exhaust port 32. Thus combustion takes place, at constant volume, in each chamber 16 while said chambers are closed to both the intake and exhaust ports. Following combustion, the chambers 16 sequentially move into communication with and across the exhaust port 32. When a particular chamber 16 moves into communication with the exhaust port 32 its combustion gases immediately begin to discharge through said port into the lower pressure of the duct 34. As a result, an expansion wave is transmitted through said moving chamber toward the inlet end wall 20, from the point 38 at the outlet end wall 22, as indicated by the dot-and-dash line 40. As illustrated, the timing is such that when said expansion wave 40 reaches the inlet end wall at 42, its chamber 16 moves into communication with the inlet port 24 so that said chamber is now in communication with both the inlet port 24 and the exhaust port 32. Accordingly, as the inlet end of a chamber 16 moves into communication with the inlet port 24, the low pressure resulting from its expansion wave 40 and the outward flow of the combustion gases from said chamber 16 draw relatively cool fresh charge from the inlet port 24 into said chamber. As a chamber 16 moves beyond the point 42, the incoming cool fresh charge flows into said chamber and replaces the combustion gases discharging from said chamber. The dot-and-dash line 44 indicates the approximate path of the junction between the incoming cool fresh charge and the combustion gases discharging through the exhaust port 32 as its chamber moves beyond the point 42.

When the moving column of fresh charge entering a chamber 16 through the inlet port 24 reaches the outlet end wall 22 at 46, its chamber 16 is suddenly closed to the outlet port 32. As a result, the leading end of said moving column of fresh charge entering a chamber 16 is suddenly stopped at the outlet end wall 22 whereupon a pressure wave is transmitted back through its moving chamber 16 toward the inlet end wall 20, as indicated by the dot-and-dash line 48. At the same time, because of the inertia of the moving column of fresh charge entering said chamber 16, additional charge continues to enter said chamber through the inlet port 24. The timing is such that when the pressure wave 48 reaches the inlet end wall 20 at 50 its chamber 16 is suddenly closed to the inlet port 24 whereby the pressure of the charge trapped within said chamber 16, as said chamber moves beyond the inlet port 24, is greater than the pressure in the inlet port 24. As said chamber 16 moves beyond the inlet port 24 its fresh charge is ignited by the igniter 36 and the cycle is repeated. The cycle of operation obviously is the same for all the chambers 16. Since the chambers 16 sequentially and continuously move into communication with the intake and exhaust ports 24 and 32, the flow through said ports is substantially uniform and steady.

Instead of mixing the fuel with the air in the intake duct 26, fuel may be injected directly into the chambers 16 through a fuel nozzle supported by the rotor stator structure. Such an alternative arrangement is hereinafter described and is illustrated in Figure 4.

As indicated in Figure 3 each cycle corresponds to 360° of rotation or one revolution of the rotor 12 so that the inlet end wall 20 has only one port 24 and the outlet end wall 22 has only one port 32. Obviously, however, any number of cycles may take place during each revolution of the rotor. For example two cycles may be provided for each revolution of the rotor by adding another inlet port, another outlet port and another igniter with each cycle taking place in 180° of rotor rotation. As also illustrated in Figure 3 suitable guide vanes 52, or other means of controlling rotation of the gases, may be provided in the inlet port so that the charges may enter the rotating chambers 16 without shock.

At this point it should be noted that in Figure 3 a simplified wave action has been assumed in describing the action and timing of the rotary combustion unit. A similar simplified wave action has been assumed in connection with the other modifications hereinafter described. Actually the waves 40 and 48 do not merely travel along straight lines, as illustrated, but these waves will fan out to an appreciable thickness. In addition the speed of each wave generally will vary across the width of each chamber 16. For both of these reasons the arrival of a wave at an end of a chamber 16 is not confined to one point at a particular time but said wave will extend across its chamber and its time of arrival will vary across its chamber. In addition the junction between a charge entering a chamber 16 and the combustion gases leaving said chamber does not follow a precise straight line path 44 as illustrated but, as a result of diffusion between said charge and combustion gases, said path has appreciable width. Because of this spreading of the waves 40 and 48 and the junction 44, the timing of the ports may be varied considerably so as to control both the compression obtained within and the quantity of air drawn into each chamber 16. For example the edge 50 of the port 24 may be made circumferentially adjustable whereby by moving said edge to the left (Figure 3) the compression within each chamber 16 and the quantity of charge drawn therein can be reduced.

In Figure 3 it has been assumed that the combustion gases expand, in one wave 40, at least down to the pressure of the inlet port 24. However, the pressure obtained in each chamber 16, after combustion therein, may be too high for expansion of the resulting combustion gases down to the pressure in the inlet port 24 in one such wave 40. If such is the case in Figure 3, fresh charge cannot enter the chambers 16 from the inlet port 24 because of the higher pressure in said chambers. Figure 4 illustrates an arrangement wherein the expansion of the combustion gases takes place in several waves whereby, as compared to Figure 3, a greater reduction in pressure in each chamber 16 is obtained as the combustion gases discharge from said chamber, the resulting lower pressure helping to induce flow of fresh charge into said chamber.

As illustrated in Fig. 3, the length of time in each cycle a chamber 16 is solely in communication with either the intake port 24 or the exhaust port 32 is substantially less than the length of time said chamber is simultaneously in communication with both said ports. This necessarily follows from the timing sequence or cycle described since the expansion and compression waves 40 and 48 travel at the velocity of sound in their respective media while the front 44 of the entering fresh charge advances at a much slower velocity equal to the flow velocity of the incoming fresh charge.

Figure 4 is generally similar to Figure 3 except in Figure 4 the exhaust port has a greater circumferential width in order to provide for more than one expansion wave in each chamber 16 as the combustion gases discharge into said port. Accordingly in Figure 4 the parts corresponding to those of Figure 3 have been indicated by like reference numerals. As illustrated in Figure 4 fuel is injected directly into each chamber 16 through a fuel nozzle 54 as each chamber 16 moves past said fuel nozzle. Preferably the fuel nozzle 54 is disposed at least slightly ahead of the igniter 36 in order that a substantially uniform combustible mixture be formed within each chamber 16 prior to its ignition. In lieu of the fuel nozzle 54 fuel may be introduced into the intake duct just as in Figure 3.

In Figure 4, after combustion in a chamber 16, said chamber moves into communication with an exhaust port 32a in the outlet end wall 22. Thereupon a first expansion wave is transmitted through said moving chamber 16 toward the inlet end wall 20 as indicated by the dot-and-dash line 70. The timing is such that when this expansion wave 70 reaches the inlet end wall 20 its chamber 16 is still closed by said wall and, since the entire column of combustion gases in said chamber is now moving toward the exhaust port 32a, a second expansion wave is reflected back through its chamber 16 toward the exhaust port 32a as indicated by a dot-and-dash line 72. When this reflected wave 72 reaches the exhaust port 32a at 74 another expansion wave is transmitted through its chamber 16 toward the inlet end wall 20 as indicated by the dot-and-dash line 76. The timing illustrated is such that when this later expansion wave 76 reaches the inlet end wall 20 at 78, its chamber 16 moves into communication with the inlet port 24. As a result, a fresh charge flows into said chamber 16 from the inlet port 24 thereby replacing the combustion gases discharging from said chamber 16. The dot-and-dash line 80 indicates the approximate path of the junction between the cool fresh charge entering a moving chamber 16 and the combustion gases discharging from said chamber through the exhaust port 32a.

The remainder of the cycle of Figure 4 is like that of Figure 3. Thus when the moving column of fresh charge entering a chamber 16 reaches the outlet end wall 22 at 82, its chamber 16 is suddenly closed to the exhaust port 32a whereupon a pressure wave 84 is transmitted back through its moving chamber 16 toward the inlet end wall 20. Because of the inertia of said incoming charge additional charge continues to enter said chamber 16 and the timing is such that when the pressure wave 84 reaches the inlet end wall 20 at 86 its chamber 16 is closed to the inlet port 24. Thereafter fuel is introduced into said chamber through the fuel nozzle 54 and the resulting combustible mixture is ignited by the spark plug 36 as said chamber moves past said plug. The above described cycle is then repeated. Particularly because neither the expansion and compression waves nor the path of the junction between an incoming fresh charge and the discharging combustion gases are confined to the linear paths indicated, the invention is not limited to either the exhaust port arrangement of Figure 3 or the exhaust port arrangement of Figure 4. For example, the exhaust port may have a circumferential width intermediate that of Figures 3 and 4 or it may have a circumferential width greater than that of Figure 4. In addition the positions of the circumferentially spaced walls of the exhaust port may be shifted relative to the intake port.

Where the expansion of the combustion gases out from the chambers 16 takes place in more than one wave, as for example in Figure 4, it is possible to divide the exhaust port into a high pressure exhaust port and a low pressure exhaust port. Such an arrangement is illustrated in Figure 5 wherein the exhaust port 32a of Figure 4 has been divided into a high pressure exhaust port 90 and a low pressure exhaust port 92 by a partition 94. Figure 5 is otherwise similar to Figure 4. In Figure 5, when a chamber 16 moves into communication with the exhaust port 90, the combustion gases immediately begin to discharge from said chamber into said port from said chamber 16 whereupon an expansion wave 96 is transmitted toward the inlet end wall 20. When the wave 96 reaches the inlet end wall 20 a wave 98 is reflected back toward the outlet end wall 22. The timing is such that the partition 94 closes said chamber 16 just as its reflected wave 98 reaches the outlet end wall 22. The combustion gases left in said chamber 16 are now at a reduced pressure and when said chamber moves beyond the partition 94 said combustion gases immediately discharge into the low pressure exhaust port 92 whereupon an expansion wave 100 is transmitted through said chamber toward the inlet end wall 20. The timing is such that the expansion wave 100 reaches the inlet end wall 20 as its chamber 16 moves into communication with the inlet port 24. The remainder of the cycle of Figure 5 is like that of Figures 3 and 4. With the arrangement of Figure 5, the exhaust gases discharging through the port 90 are at a higher pressure than the exhaust gases discharging through the port 92. The partition 94 separating the ports 90 and 92 preferably has a width at least equal to that of the chamber 16 although this is not essential to the division of the combustion gases between the high pressure port 90 and the low pressure port 92.

In the modifications so far described it is necessary to provide some means for driving the rotary combustion unit 10. For this purpose the side walls 14 of the rotor combustion chambers 16 may be curved or inclined relative to the rotor axis so that the combustion gases on discharging from the rotor chambers drive or at least help to drive the rotor 12. Such an arrangement is illustrated in Figure 6. In Figure 6 rotor chambers 16a are similar to the rotor chambers 16 of Figure 3 except their side walls 14a are helically inclined to the rotor axis whereby the combustion gases discharging from the chambers 16a into the exhaust port impinge against their side walls 14a thereby urging the rotor from left to right as viewed in Figure 6. Instead of curving or inclining the entire length of each combustion chamber wall 14a for providing the rotor with driving torque it is only necessary that the discharge end of each wall 14a be inclined relative to the rotor axis. However inclining the whole length of the combustion chamber walls 14a probably constitutes a more efficient arrangement for extracting energy from the discharging combustion gases for driving the rotor. The amount of energy extracted from the combustion gases for driving the rotor will depend on the inclination of the rotor vanes 14a. The vanes 14a may be inclined to such an extent that the energy extracted from the combustion gases is only sufficient for driving the rotor at the desired speed. If desired, however, more energy may be extracted from the combustion gases by providing said vanes with a greater inclination to the rotor axis whereupon external power may be obtained directly from the rotor 12.

As illustrated, the structure of Figure 6 is identical with that of Figure 3 except for the inclination of the side walls of the rotor combustion chambers. Accordingly the cycle of operation of Figure 6 is identical to that of Figure 3. Obviously the side walls of the rotor combustion chambers of Figure 4 and 5 may also be inclined relative to the rotor axis in order to provide their rotors with driving torque.

Referring again to Figure 1, if at least the discharge ends of the vanes 14 are curved or inclined, as described in connection with Figure 6, then the rotor combustion unit 10 can be used as a jet type power plant for a vehicle. For this purpose the intake duct 26 is directed forwardly and the exhaust gases discharge rearwardly through a nozzle at the discharge end of the exhaust duct 34. With such an arrangement the exhaust gases discharge rearwardly from the exhaust duct 34 to provide the power plant with jet propulsive thrust.

Figure 7:
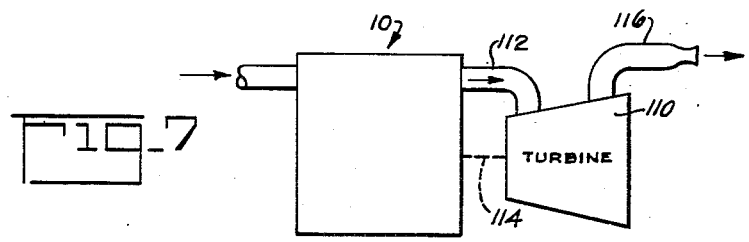
Figures 7, 8 and 9, illustrate three forms of power plants embodying the rotary combustion unit.

In addition to or in lieu of directly using the combustion gases discharging from the rotary combustion unit 10 for driving its rotor, said rotor may be driven by a turbine. Such an arrangement is illustrated in Figure 7 in which the combustion gases from the rotary combustion unit 10 are supplied to a turbine 110 through a duct 112, said turbine being drivably connected to the rotary combustion unit 10 by means schematically indicated at 114. The turbine 110 exhausts rearwardly through the exhaust duct 116 to provide the power plant with jet propulsive thrust.

Figure 8:
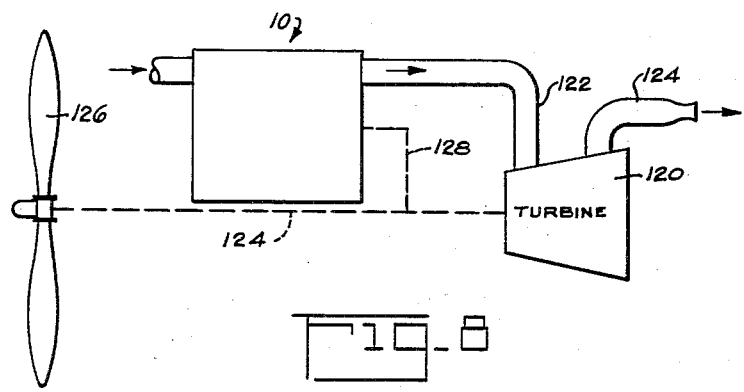
Figure 9:
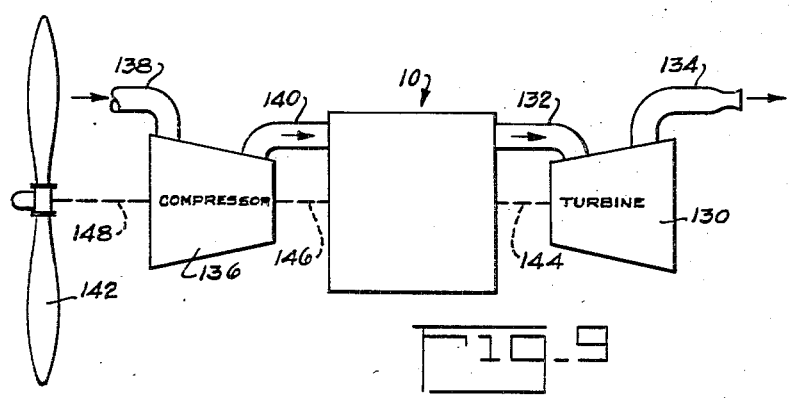

If the combustion gases from the rotary combustion unit 10 are supplied to a turbine, then said turbine may be drivably connected to vehicle propelling means. Figures 8 and 9 illustrate two possible power plant arrangements in which a turbine is so used. In Figure 8 the combustion gases are supplied to a turbine 120 through a duct 122 and the gases exhaust rearwardly from the turbine through an exhaust duct 124. In addition, by means schematically indicated at 124, the turbine is drivably connected to vehicle propelling means which, in the case of an aircraft, may comprise a conventional aircraft propeller 126. In order to drive the rotor of the combustion unit 10, the combustion gases preferably are utilized as in Figure 6 for providing said rotor with driving torque whereby no driving connection is needed between the turbine 120 and the combustion unit 10 and the speed of rotation of said unit is independent of vehicle speed. If desired, however, the turbine 120 may also be drivably connected to the rotor of the combustion unit 10 as schematically indicated at 128.

In any of the aforedescribed power plant arrangements, if a higher compression of the charges supplied to the rotor combustion unit 10 is desired than is obtainable from said combustion unit by itself, then a compressor may be provided for initially compressing the air supplied to said unit. Such a compressor may be driven by the driving torque on the rotor of the combustion unit 10 whether said torque is obtained directly from the unit 10 or from a turbine driven by said gases. Figure 9 illustrates a power plant arrangement in which such a compressor has been included.

In Figure 9 the rotary combustion unit 10 supplies combustion gases to a turbine 130 through a duct 132 and said turbine exhausts rearwardly through an exhaust duct 134. The power plant also includes a compressor 136 having a forwardly directed air intake duct 138, said compressor supplying compressed air to the rotary combustion unit 10 through a duct 140. In addition, the power plant includes vehicle propelling means 142. The combustion unit 10, the turbine 130, the compressor 136, and the propelling means 142 are all drivably connected together by means schematically indicated at 144, 146, and 148.

Where the combustion gases for the rotary combustion unit 10 are supplied to a turbine, said rotary combustion unit may have any of the arrangements illustrated in Figures 3 and 6. If the rotary combustion unit has the double exhaust port arrangement of Figure 5, the high pressure exhaust port 90 preferably is connected to the turbine while the low pressure gases discharging through the low pressure port 92 are utilized directly as a jet to provide the power plant with jet propulsive thrust.

In a conventional power plant for a jet or a gas turbine engine, the combustion unit comprises a fixed structure so that said unit cannot add to the compression ratio of the power plant and combustion takes place at substantially constant pressure. A power plant including the rotary combustion unit of the present invention inherently is more efficient both because the rotary combustion unit can be used to increase the compression ratio and because combustion takes place at substantially constant volume which is more efficient than constant pressure combustion. However, unlike prior art constant volume combustion chambers where combustion is intermittent in any one chamber, the rotary combustion unit of this invention permits substantially steady flow through the inlet and exhaust ducts of said unit thereby reducing flow losses in said ducts. In addition the configuration of the rotor and stator of the combustion unit permit the inlet and exhaust ports to have an effective cross-section at least equal to that of the combustion chambers thereby permitting maximum use of the available combustion chamber volume, maximum scavenging of the exhaust products after each combustion, and minimum flow losses in both the inlet and exhaust ports as well as efficient use of wave phenomena to raise the peak working pressure level of the cycle and thus raise the cycle efficiency.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A power plant comprising a rotor having a plurality of circumferentially-spaced combustion chambers; a stator having an air intake port and an exhaust port disposed so that upon rotor rotation said air intake port communicates sequentially with said chambers at one of their ends and said exhaust port communicates sequentially with said chambers at their other ends each said chamber having a substantially constant cross-sectional area normal to the direction of flow through said chamber from its intake port end to its exhaust port end; means for adding fuel to said chambers; and means for initiating combustion within said chambers; the relative circumferential positions of said ports and the point of combustion initiation within said chambers being such that during rotor rotation and after combustion in a chamber, said chamber, cyclically and in the sequence stated, is placed in communication with said exhaust port, thereafter is placed in communication with said intake port while said chamber is still in communication with said exhaust port, thereafter is closed to said exhaust port, at a still later time is closed to said intake port, and thereafter combustion is initiated in said chamber while it is closed to both said ports; the overlap between said intake and exhaust ports being sufficiently large so that in each said cycle each chamber is simultaneously in communication with both said ports for a length of time substantially longer than the length of time said chamber is in communication solely with either of said ports such that said chamber is placed in communication with said intake port at the time the expansion wave in said chamber, resulting from the previous placing of said chamber in communication with said exhaust port, reaches the intake port end of said chamber and such that said chamber becomes closed to said exhaust port substantially at the time the incoming fresh charge reaches the exhaust port end of said chamber and such that said chamber becomes closed to said intake port substantially at the time the compression wave, resulting from said closure of its exhaust port end, reaches its intake port end.

2. A power plant comprising a rotor having a plurality of circumferentially spaced combustion chambers; a stator having an air intake port and a pair of exhaust ports disposed so that upon rotor rotation said air intake port communicates sequentially with said chambers at one of their ends and each of said exhaust ports communicate sequentially with said chambers at their other ends; means for adding fuel to said chambers; and means for initiating combustion within said chambers; the relative circumferential positions of said ports and the point of combustion initiation within said chambers being such that during rotor rotation and after combustion in a chamber, said chamber, cyclically and in the sequence stated, is placed in communication with one of said exhaust ports, is closed to said one exhaust port, is placed in communication with the other of said exhaust ports, is placed in communication with said intake port, is closed to said other exhaust port, is closed to said intake port, and thereafter combustion is initiated in said chamber while it is closed to all of said ports, the overlap between said intake port and said other exhaust port being sufficiently large so that in each said cycle each said chamber is simultaneously in communication with said intake port and said other exhaust port for a length of time substantially longer than the length of time said chamber is in communication solely with either of said latter two ports.

3. A power plant comprising a rotor having a plurality of circumferentially-spaced combustion chambers; a stator having an air intake port and a pair of exhaust ports disposed so that upon rotor rotation said air intake port communicates sequentially with said chambers at one of their ends and each of said exhaust ports communicate sequentially with said chambers at their other ends each said chamber having a substantially constant cross-sectional area normal to the direction of flow through said chamber from its intake port end to its exhaust port end; means for adding fuel to said chambers; and means for initiating combustion within said chambers; the relative circumferential positions of said ports and the point of combustion initiation within said chambers being such that during rotor rotation and after combustion in a chamber, said chamber, cyclically and in the sequence stated, is placed in communication with one of said exhaust ports, is closed to said one exhaust port, is placed in communication with the other of said exhaust ports, is placed in communication with said intake port while said chamber is still in communication with said other exhaust port, thereafter is closed to said other exhaust port, at a still later time is closed to said intake port and thereafter combustion is initiated in said chamber while it is closed to both said ports; the overlap between said intake port and said other exhaust port being sufficiently large so that in each said cycle each chamber is simultaneously in communication with both said intake port and said other exhaust port for a length of time substantially longer than the length of time said chamber is in communication solely with said intake port such that said chamber becomes closed to said other exhaust port substantially at the time the incoming fresh charge reaches the exhaust port end of said chamber and said chamber becomes closed to said intake port substantially at the time the compression wave resulting from said closure of its exhaust port end, reaches its intake port end.

References Cited in the file of this patent

UNITED STATES PATENTS

| 674,676 | Fievet | May 21, 1901 |
| 1,150,361 | Griepe | Aug. 17, 1915 |
| 2,395,404 | Goddard | Feb. 26, 1946 |
| 2,399,394 | Seippel | Apr. 30, 1946 |
| 2,579,321 | Kadenacy | Dec. 18, 1951 |
| 2,591,549 | Jonker | Apr. 1, 1952 |
| 2,612,022 | Keys | Sept. 30, 1952 |

FOREIGN PATENTS

| 469,180 | Great Britain | July 20, 1937 |
| 548,868 | Great Britain | Oct. 28, 1942 |
| 560,075 | Germany | Nov. 2, 1932 |
| 844,442 | France | Apr. 24, 1939 |